(12) United States Patent
Kuo et al.

(10) Patent No.: US 12,489,491 B2
(45) Date of Patent: Dec. 2, 2025

(54) BEAM-STEERING BACKSCATTER CIRCUIT FOR INTEGRATED TAG DEVICE

(71) Applicant: The Regents of the University of California, Oakland, CA (US)

(72) Inventors: Shih-Kai Kuo, La Jolla, CA (US); Manideep Dunna, La Jolla, CA (US); Dinesh Bharadia, La Jolla, CA (US); Patrick Mercier, La Jolla, CA (US)

(73) Assignee: The Regents of the University of California, Oakland, CA (US)

( * ) Notice: Subject to any disclaimer, the term of this patent is extended or adjusted under 35 U.S.C. 154(b) by 81 days.

(21) Appl. No.: 18/387,321

(22) Filed: Nov. 6, 2023

(65) Prior Publication Data

US 2024/0178884 A1 May 30, 2024

Related U.S. Application Data

(60) Provisional application No. 63/428,974, filed on Nov. 30, 2022.

(51) Int. Cl.
*H04B 7/04* (2017.01)
*H04B 7/06* (2006.01)
*H04B 7/22* (2006.01)

(52) U.S. Cl.
CPC ....... *H04B 7/04013* (2023.05); *H04B 7/0617* (2013.01); *H04B 7/22* (2013.01)

(58) Field of Classification Search
CPC ..... H04B 7/04013; H04B 7/0617; H04B 7/22
See application file for complete search history.

(56) References Cited

U.S. PATENT DOCUMENTS

| | | | |
|---|---|---|---|
| 11,411,597 B2* | 8/2022 | Reynolds | ................ H04W 4/80 |
| 2021/0067911 A1* | 3/2021 | Kawaguchi | .......... H04B 1/0458 |
| 2022/0255587 A1 | 8/2022 | Dunna et al. | |
| 2023/0044299 A1 | 2/2023 | Zhuang et al. | |
| 2023/0119392 A1 | 4/2023 | Wang et al. | |
| 2024/0106532 A1* | 3/2024 | Mahalingam | ..... H04W 52/0229 |

FOREIGN PATENT DOCUMENTS

WO 2022212630 A1 10/2022

OTHER PUBLICATIONS

Liu, et al., "VMscatter: A Versatile MIMO Backscatter", 17th USENIX Symposium on Networked Systems Design and Implementation, 2020, pp. 895-909.
Wang, et al., "Pushing the Range Limits of Commercial Passive RFIDs", 16th USENIX Symposium on Networked Systems Design and Implementation, 2019, pp. 301-315.
Zhao, et al., "Spatial Stream Backscatter Using Commodity WiFi", MobiSys, 2018, pp. 1-13.

* cited by examiner

*Primary Examiner* — Jean B Corrielus
(74) *Attorney, Agent, or Firm* — Greer, Burns & Crain, Ltd.; Steven P. Fallon

(57) ABSTRACT

A beam-steering backscatter circuit in an integrated tag device. The circuit includes an antenna array and SP4T reflector array configured to receive and transmit through the antenna array. A baseband phase-shifting module modulates an incident signal based upon tag data to create an output signal and re-radiates the output signal with a controllable angle of direction through the SP4T reflector array. A phase locked loop synchronized with a wake-up receiver provides an intermediate frequency (IF) clock to the baseband phase shifting-module.

9 Claims, 10 Drawing Sheets

BEAM-STEERING BACKSCATTER CIRCUIT FOR INTEGRATED TAG DEVICE

PRIORITY CLAIM AND REFERENCE TO RELATED APPLICATION

The application claims priority under 35 U.S.C. § 119 and all applicable statutes and treaties from prior U.S. provisional application Ser. No. 63/428,974 which was filed Nov. 30, 2022.

STATEMENT OF GOVERNMENT INTEREST

This invention was made with government support grant number 1923902 awarded by National Science Foundation. The government has certain rights in the invention.

FIELD

A field of the invention includes wireless communications, communications with commodity Wi-Fi transceivers, and low-power wake-up of wireless receivers via Wi-Fi and BLE communications.

TABLE OF ACRONYMS
The following table defines acronyms/abbreviations:

| | |
|---|---|
| AP | Access Point |
| ASK | Amplitude Shift Keying |
| BLE | Bluetooth Low Energy |
| BPSK | Binary Phase Shift Keying |
| Bps | Bits Per Second |
| CW | Continuous Wave |
| CSI | Channel State Information |
| CMOS | Complementary Metal Oxide Semiconductor |
| DIFS | Distributed Interframe Space |
| dBi | Antenna Gain |
| dBm | Decibel Milliwatts |
| ED | Envelope Detector |
| GHz | Gigahertz |
| IC | Integrated Circuit |
| IF | Intermediate Frequency |
| IoT | Internet of Things |
| IRR | Image Rejection Ratio |
| IQ | In Phase and Quadrature |
| LNA | Low-Noise Amplifier |
| LO | Local Oscillator |
| LSB | Lower Sideband |
| Mbps | Megabits Per Second |
| MIMO | Multiple-Input and Multiple-Output |
| MUX | Multiplexer |
| NFC | Near Field Communications |
| NMOS | N Channel MOSFET |
| OOK | On Off Keying |
| PA | Power Amplifier |
| PLL | Phase Locked Loop |
| PSK | Phase Shift Keying |
| QPSK | Quadrature Phase Shift Keying |
| RCC R | Resistor Capacitor Capacitor Resistor |
| RF | Radio Frequency |
| RFID | Radio Frequency Identification |
| RSSI | Received Signal Strength Indicator |
| RX | Receiver |
| SSB | Single Sideband |
| TRX | Transceiver |
| TX | Transmitter |
| USB | Upper Sideband |
| VBS | Body-to-Source Substrate Bias |
| VCO | Voltage Controlled Oscillator |
| Wi-Fi | Wireless Compatible with the Wi-Fi Alliance |
| WuRX | Wake Up Receiver |
| XOR | Exclusive OR function |
| XTAL | Crystal |

BACKGROUND

Wang et al PCT Published Application WO 2021/136480 describes a method for communicating directly with commodity Wi-Fi transceivers (TRXs) via backscatter modulation in an integrated tag device. Disclosed circuits allow receivers to be woken up directly via a Wi-Fi TRX using a 2.8 μW wake-up receiver with −42.5 dBm sensitivity—good enough for >30 m wake-up range, and backscatters to a frequency-translated Wi-Fi channel via an on-chip 28 μW single-side-band QPSK modulator. Wireless tests revealed a range of 21 m between Wi-Fi access points. Misalignment between the backscatter symbol timing and the original symbols in the Wi-Fi packet can change the barker code, which hurts the signal to interference ratio.

Mercier et al., PCT Published Application WO 2022/212630 advanced the state of the art and provides a wake-up receiver having an energy-detection based architecture. A counter-based wake up circuit is responsive to two pre-specified WiFi compatible packets. A sync receiver is enabled by the wake-up receiver upon reception of two pre-specified WiFi compatible packets. A backscatter transmitter is enabled by a backscatter enable signal. The '630 publication demonstrated that MIMO antenna gain is possible through a retro-reflective IQ-modulated Van Atta array utilizing fixed-delay transmission lines connected to alternate antennas for SSB QPSK modulation. The fixed-delay transmission lines occupy a relatively large board area and are not tunable. As a result, beam steering is not possible, and co-located APs (which have difficult self-interference challenges in current commodity hardware) are required.

Other efforts such as VMScatter have focused on increasing throughput and reducing bit error rate (BER) through spacetime coding mechanisms. X. Liu, Z. Chi, W. Wang, Y. Yao, and T. Zhu, "VMscatter: A versatile MIMO backscatter," in 17th USENIX Symposium on Networked Systems Design and Implementation (NSDI 20). Santa Clara, CA: USENIX Association, February 2020, pp. 895-909.

MOXcatter implements an antenna array on the tag but cannot fully exploit the benefits of a MIMO setup due to clocks with identical phases driving the backscatter switches. J. Zhao, W. Gong, and J. Liu, "Spatial stream backscatter using commodity wifi," in Proceedings of the 16th Annual International Conference on Mobile Systems, Applications, and Services, ser. MobiSys '18. New York, NY, USA: Association for Computing Machinery, 2018, p. 191-203.

PushID utilizes distributed MIMO readers to create energy peaks in space. J. Wang, J. Zhang, R. Saha, H. Jin, and S. Kumar, "Pushing the range limits of commercial passive RFIDs," in 16th USENIX Symposium on Networked Systems Design and Implementation (NSDI 19). Boston, MA: USENIX Association, February 2019, pp. 301-316. This approach eliminates the need to fine-tune optimal beam-forming parameters at RFID tags prior to communication. However, implementing such a distributed MIMO reader system requires a higher number of readers, leading to increased deployment costs.

SUMMARY OF THE INVENTION

A preferred embodiment provides a beam-steering backscatter circuit. The circuit includes an antenna array and SP4T (single pole four throw) reflector array configured to receive and transmit through the antenna array. A baseband phase-shifting module modulates an incident signal based upon tag data to create an output signal and re-radiates the output signal with a controllable angle of direction through the SP4T (single pole four throw) reflector array. A phase locked loop synchronized with a wake-up receiver provides an intermediate frequency (IF) clock to the baseband phase shifting-module.

DETAILED DESCRIPTION OF THE PREFERRED EMBODIMENTS

A preferred embodiment provides beam steering with a transmission-line-less fully-reflective SP4T RF backscatter interface, which interface minimizes power loss while maximizing communication range. The preferred embodiment includes a multi-antenna array and SP4T RF reflectors together with a baseband phase-shifting technique to re-radiate the incident WiFi signal with a controllable angle of direction. Phase shifts are absorbed into the intermediate frequency (IF) domain on the tag.

The invention has been tested and a chip implementation was fabricated using 65-nm CMOS process and operated at a power consumption of 5.5 µW in standby mode. In backscattering mode, it consumes 39 µW for the single-antenna approach and 88 µW for the multi-antenna approach. The worst-case access point (AP)-to-AP range was 35 m and 56 m for the single-antenna and multi-antenna approaches, respectively.

A preferred WiFi/BLE backscattering receiver tag is woken up by a pre-specified sequence of WiFi or BLE packets by using an ED-first architecture with a counter-based correlator that is immune to the uncertainty of packet gap lengths. After the tag is woken up, it can be either used in WiFi or BLE mode, with the beam steering option available in WiFi mode. Two preferred implementations of the BLE modulator include: 1) a BLE-only mode, where it is more hardware efficient to implement as a one-bit multiplexer that select either $f_{IF,OUT}$ or $f_{IF,OUT} \pm 0.5$ MHz based on the tag data; or 2) when QPSK WiFi is also needed in a combo-chip, it is more hardware efficient to reuse the QPSK WiFi modulator by applying the XOR function with one input using the BLE tag data, and the other set to 0.

A preferred embodiment is a single-side-band (SSB) QPSK WiFi/BLE backscatter solution via a transmission-line-less multiplexed reactive termination approach with 3 dB improved insertion loss and that maximizes the communication range. It provides a dynamically-controllable beam steering MIMO SSB QPSK Wi-Fi backscatter solution via an array of four multiplexed reactive termination networks driven by a phased IF I/Q generator. The array and a beam steering modulator enable beam-steering and separately provides BLE-compatible FSK backscatter that provides compatibility with BLE devices via a single-antennas WiFi/BLE modulator. A preferred implementation provides beam steering that leverages multiple copies of the fully-reflective SP4T termination, where the relative timing of the switches are set by phase control in the beam steering modulator. By delaying the timing of reflections by a controllable phase (4), in-air power can be added constructively in specific, controllable directions.

Preferred embodiments of the invention will now be discussed with respect to experiments and drawings. Broader aspects of the invention will be understood by artisans in view of the general knowledge in the art and the description of the experiments that follows.

Figure 1A:
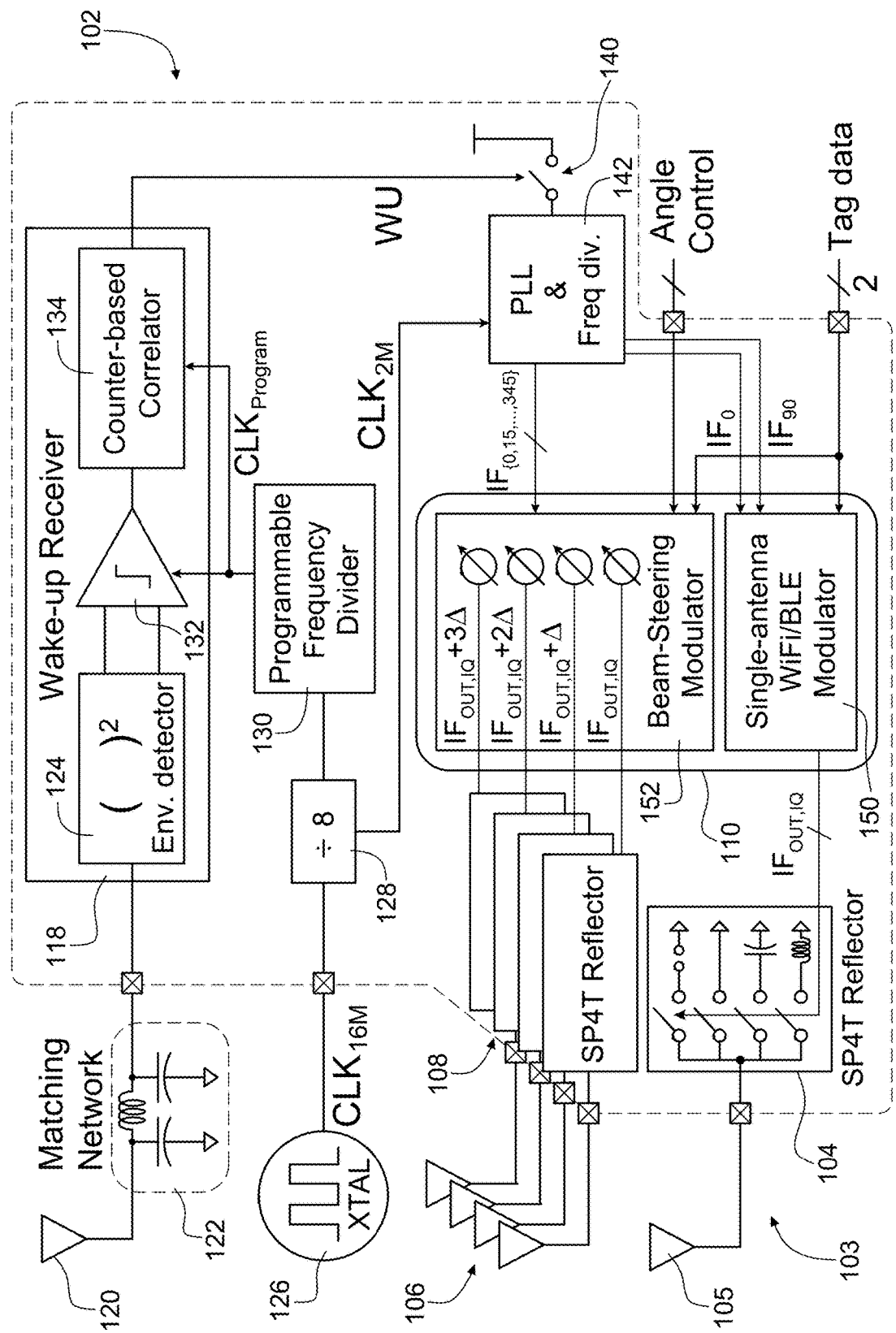
FIGS. 1A-1E show a preferred backscatter tag of the invention, which includes a reflective termination having beam steering.

FIG. 1A shows a preferred backscatter tag 102 of the invention, which includes a reflective termination 103 having beam steering. The reflective termination also includes transmission-line-less fully-reflective SP4T RF backscatter switch 104 and single antenna 105 and through a multi-antenna array 106 and SP4T RF switches 108 (each having the same construction as the fully-reflective SP4T RF backscatter switch 104) together with a baseband phase-shifting module 110 to re-radiate the incident WiFi signal with a controllable angle of direction provided by an angle control signal. The angle control signal is independent of the incident angle, and can be generated on-chip according to environment or device specific parameters. The angle control signal can be dependent on the incident angle. The angle control can be decided by the access points based on collected channel measurements. The angle control information can be provided to the tag, which then uses that information to generate the angle control signal. The tag 102 shown in FIG. 1A includes both the backscatter switch 104 and the SP4T RF switch array 108 as a prototype, while artisans will recognize that the SP4T RF switch array 108 can be used alone in a tag. SP4T RF switch array 108 includes four duplicates of 104.

A front end of the tag 102 includes a wake-up receiver 118 that receives signals from an antenna 120. A matching network 122 can be employed to provide passive RF gain, e.g. 8 dB of gain. The wake-up signal is first amplified and filtered via the network 122 and then an envelope detector (ED) 124 directly demodulates an RF wake-up signal to baseband via its $2^{nd}$ order nonlinearity. The ED 124 can include a programmable capacitor to set the bandwidth for baseband signal filtering. Use of a programmable capacitor provides the ability to adopt different packet length and optimize sensitivity under different wake-up patterns. A fixed capacitor can be used for specific applications, e.g., where packet lengths and sensitivity requirements are determined and then an optical fixed capacitance can be selected.

Output of the ED 124 is preferably oversampled clock, e.g. 40 kHz generated from a crystal clock generator 126, a division circuit 128 and a programmable frequency divider 130. Output of the ED 124 is then and digitized by a two-stage dynamic comparator 132 with a programmable threshold to reduce offset voltage issues and optimize sensitivity. The comparator output is then processed by a counter 134, e.g., an 8-bit counter, to count the packet length with programmable error tolerance to enable robust detection of a pre-specified WiFi/BLE signature. An 8-bit counter 134 operating at 40 kHz is enough to detect packets of duration 6.4 ms which is much higher than the WiFi or BLE packet duration in a tested implementation. A counter with more than 8 bits can be implemented if needed.

The wake-up event triggers a switch 140 to enable a backscatter response by turning on a phase-locked-loop (PLL) and frequency divider module 142. The switch 140 can be turned off after successful detection of the data packet to save power (average of 50 μs in an example implementation). A preferred hierarchical wake-up scheme can be used and is described in PCT Published Application WO 2022/212630.

The PLL 142 is activated and generates multiple-phase IF clocks utilizing a 2 MHz reference clock, which is also obtained by dividing the 16 MHz crystal 126. SP4T reflector control signals, namely $IF_{OUT,IQ}$, are generated by a single-antenna WiFi/BLE modulator 150 that combines the quadrature IF clocks with 2-bit tag data (stored in memory on the tag). A beam-steering modulator 152 digitally phase-shifts the IF control signals, producing $IF_{OUT,IQ}$, $IF_{OUT,IQ}+\Delta$, $IF_{OUT,IQ}+2\Delta$, and $IF_{OUT,IQ}+3\Delta$. These signals are then directed to the SP4 T reflector array 108 to complete the beam-forming process. The SP4T RF switch array 108 of FIG. 1A includes four switches and antennas 106, but the present beam steering module is scalable to much larger arrays as the phase module can add additional $n\Delta$ phase shifts.

Figure 1B:
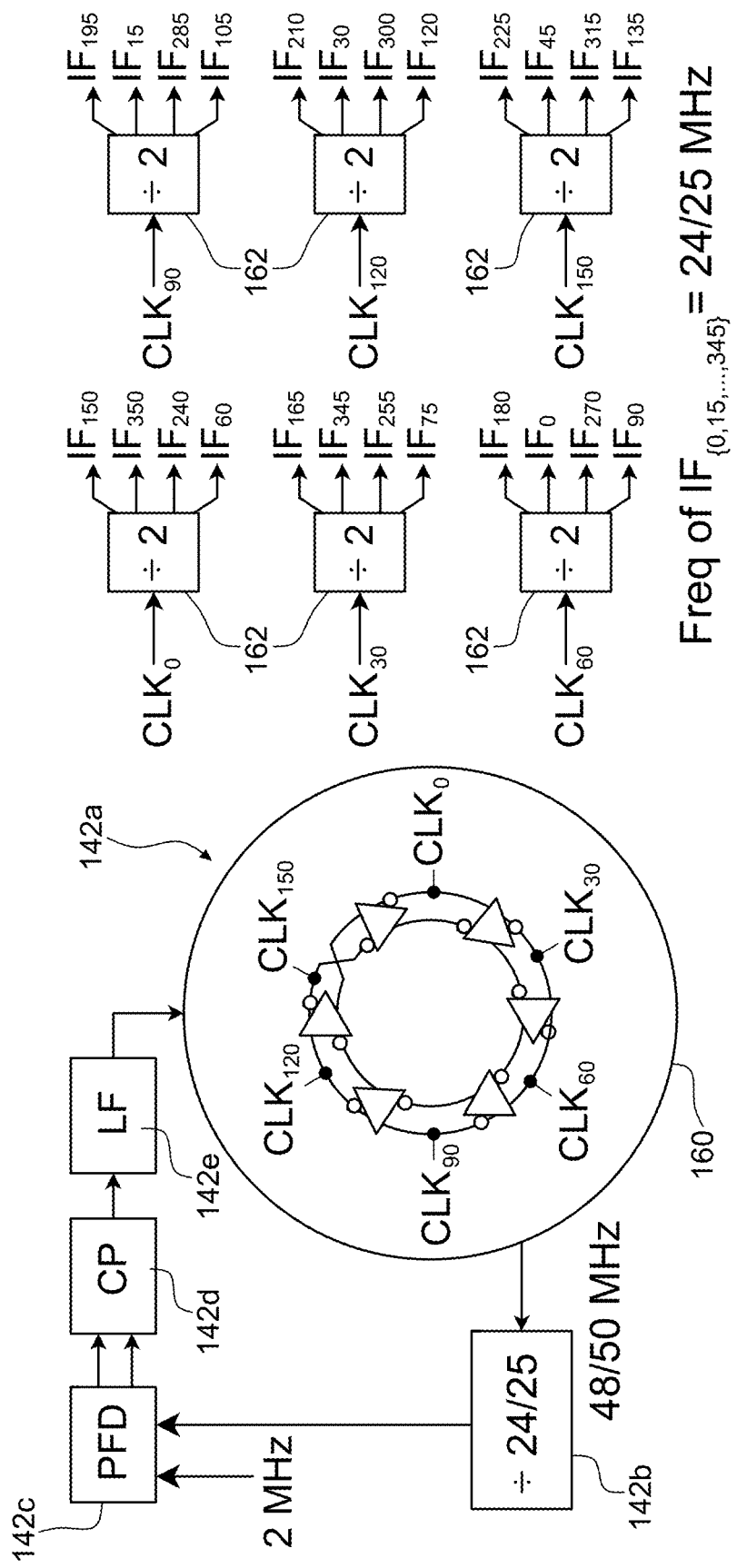

To enable backscattering of WiFi signals from Channel 6 to either Channel 1 or Channel 11, a 25 MHz Intermediate Frequency (IF) is required. Similarly, for backscattering BLE signals between Channel 37 and Channel 38, a 24 MHz IF is needed. To generate these frequencies, a standard type II integer PLL 142a that leverages a flexible divider ratio is preferred, as shown in FIG. 1B. In the PLL 142a, divider 142b having a ratio of 24 or 25 is fed back into a phase/frequency detector (PFD) 142c that provides phase error output that controls a charge pump (CP) 142d, an output of which adjusts a ring oscillator 160 to correct phase error via a loop filter 142e.

A 2 MHz reference clock is obtained by dividing the 16 MHz crystal oscillator 126. A 6-stage differential ring Voltage Controlled Oscillator (VCO) 160 is utilized to generate 12 phase clocks operating at either 48 MHz or 50 MHz. These clocks are subsequently fed through six divider-by-2 blocks 162, resulting in clocks with a 15-degree resolution at 24 MHz or 25 MHz. This configuration allows for the generation of the required IF frequencies for both WiFi and BLE backscattering operations.

Figure 1C:
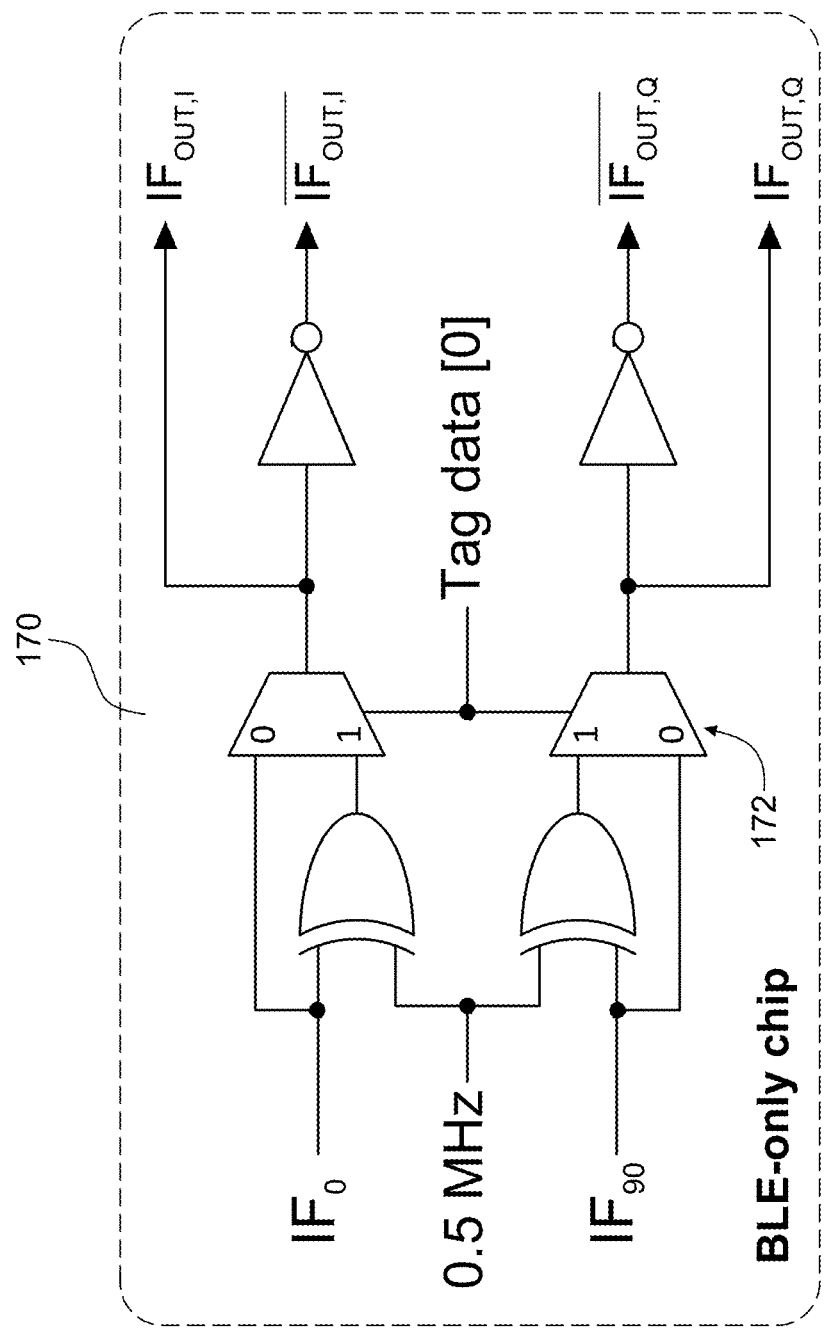

FIG. 1C shows a preferred BLE-only implementation 170, a one-bit multiplexer (MUX) 172 is controlled by the one-bit tag data. When the tag data is 0, the IF clocks are directly passed through, resulting in a backscattered signal that is a frequency-translated version of the incoming BLE signal. Conversely, when the tag data is 1, the MUX combines the IF clocks with a 0.5 MHz clock, resulting in a backscattered signal that is translated to the opposite FSK tone along with the image tone.

Figure 1D:
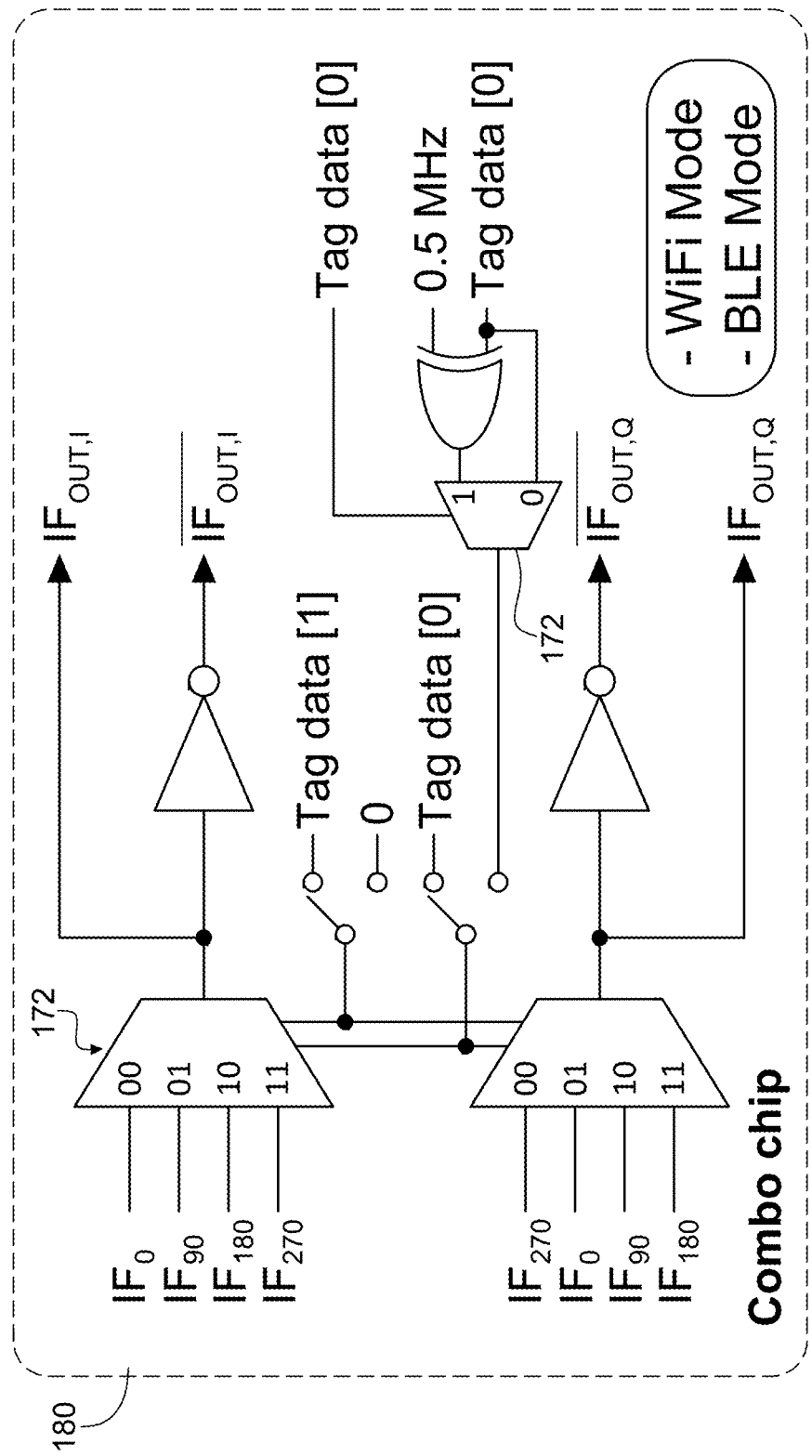

FIG. 1D illustrates a preferred implementation for a WiFi/BLE combo-chip 180. In BLE mode, one control signal for the 2-bit MUX 172 is disabled (grounded), and another control signal is connected to a one-bit MUX 182. The output of this MUX 182 is the one-bit tag data when the tag data is 0, and the XOR of the tag data with 0.5 MHz when the tag data is 1. In WiFi mode, the two-bit MUX 172 is controlled by the two-bit tag data to generate a QPSK SSB signal.

Figure 1E:
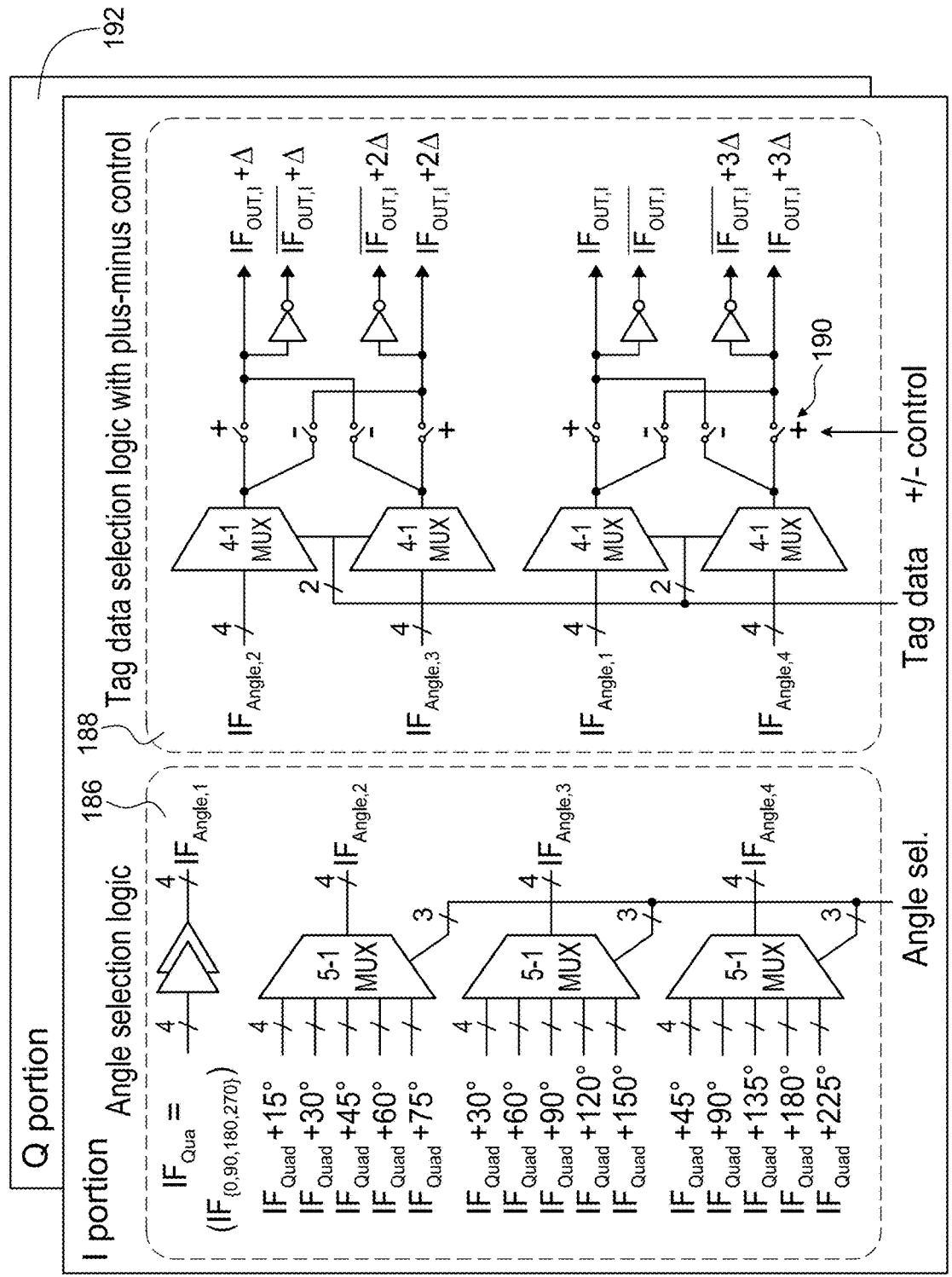

FIG. 1E illustrates a preferred implementation of the beam-steering control logic, which consists of three layers of clock selection trees. The first layer is the angle selection logic 186, responsible for determining the phase difference between each reflector. The second layer is the tag data selection logic 188, controlled by the 2-bit data, serving the same purpose as the single-antenna modulator 170 shown in FIG. 1C. Finally, the third layer is plus-minus control logic 190, which determines whether the clock phases applied to each reflector are delayed or lead compared to the neighboring one. An identical circuit is implemented for a quadrature portion 192, but with all signals shifted by 90 degrees to generate the SSB signal.

Figure 2A:
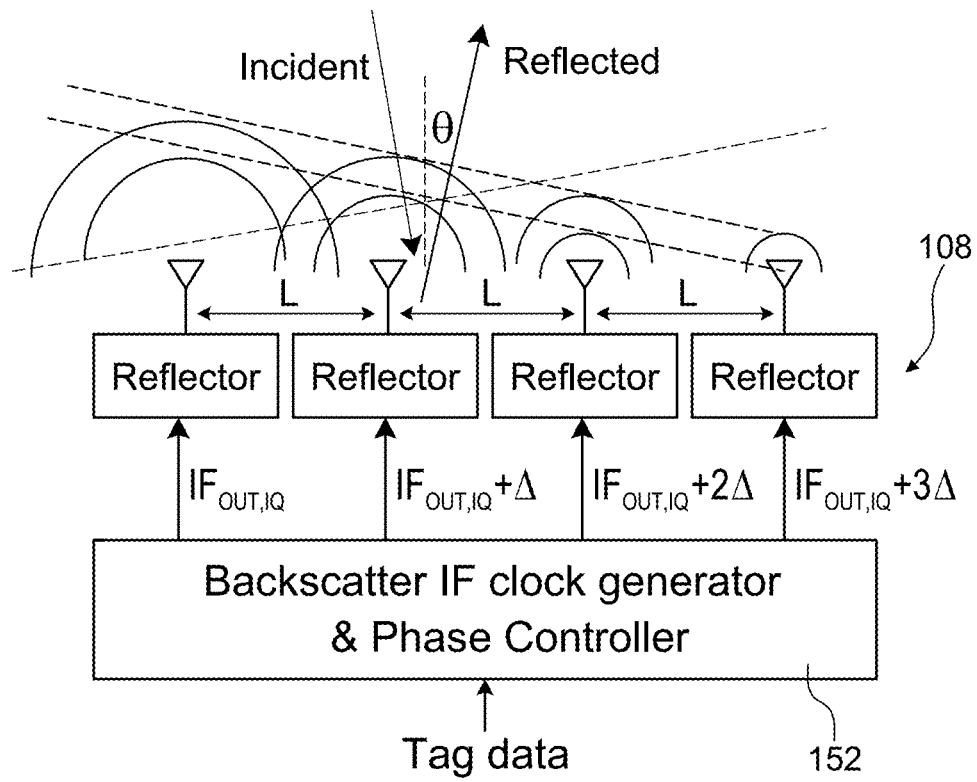
FIG. 2A shows the beam steering modulator, SP4T array and antenna array of FIG. 1A with illustration of incident signal and reflected signal steering control.

The tag 102 of FIGS. 1A-1E is configured such that is beam-steering backscatter configuration moves the phase shift to the IF domain as illustrated separately in FIG. 2A. The reflector unit 108 in the array is driven by IF clocks with a delay $\Delta$ compared to the neighboring unit, effectively absorbing the phase shifts into the IF domain. This design achieves low power operation as the complexity resides in the IF domain, which operates at tens of MHz instead of at GHz.

Figure 2B:
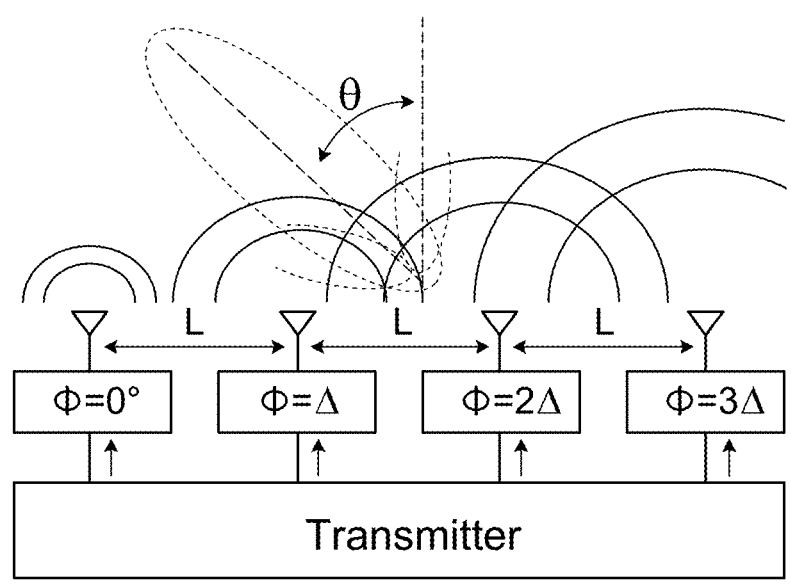
FIGS. 2B-2D (Prior Art) show prior art beam steering approaches.

In contrast, a traditional approach, illustrated in FIG. 2B involves utilizing digital controlled phase shifters to manipulate the relative phase between elements in the antenna array. This manipulation allows for the steering of the beam towards a specific direction, resulting in a longer and narrower main lobe radiation pattern. To optimize performance, such as maximizing received power, the digital signal processing block determines the optimal phase shifter weights to control. However, conventional active phase shifters encounter challenges such as loss, nonlinearity, and noise, which can limit their effectiveness. Additionally, passive phase shifters, although an alternative, often require significant space and can contribute to larger form factors.

When the antennae are separated by distance L, by controlling the relative phase $\Delta$, the following formula can be used to estimate the direction of the beam.

$$\sin\theta = \frac{\Delta}{\frac{2\pi}{\lambda}L},$$

where $\theta$ is the steering angle and $\lambda$ is the wavelength. For example, when $\Delta=30°$, the beam can be steered by 10° when the antenna separation is set as half wavelength. A separation distance of 6.25 cm is used as a practical example for the 2.4 GHz ISM band.

Figure 2C:
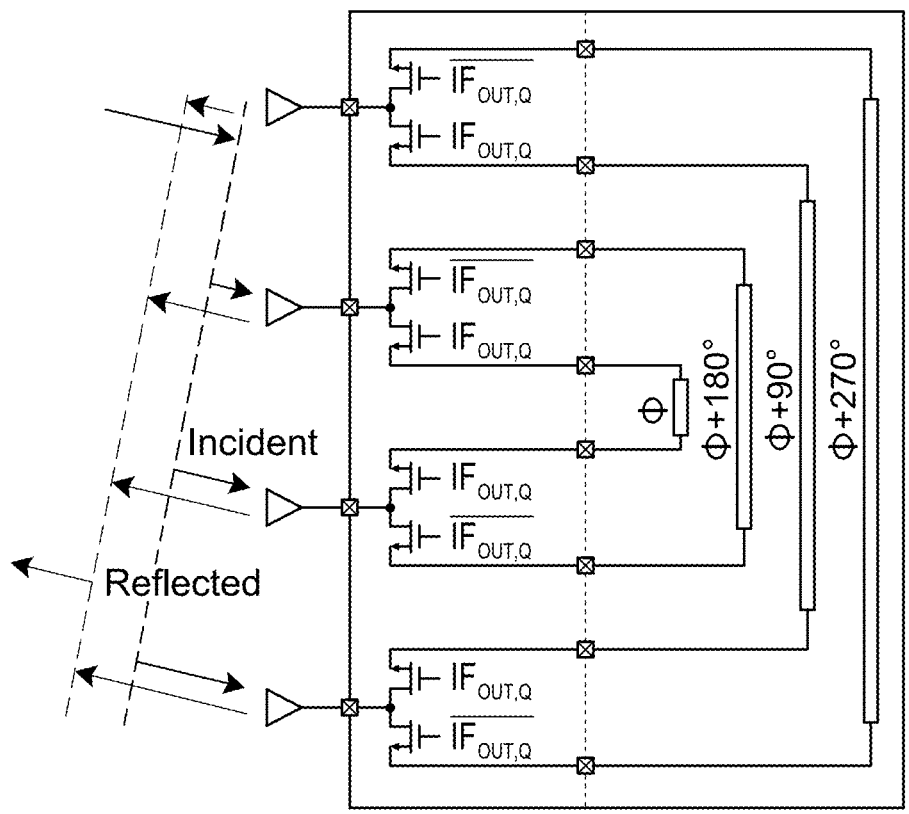

FIG. 2C shows prior approach to leverage MIMO gain without the use of lossy or power-consuming phase shifters. This design employed a Van Atta array to retro-reflect the backscattered beam back to the transmitter. Two pairs of antennas are interconnected with a quadrature-phase shifted transmission line. This configuration enables QPSK SSB backscatter without the need for power absorbing components like Wilkinson power splitters and 50Ω resistors, resulting in a noteworthy 12 dB gain improvement compared to a single-antenna approach. However, the transmission lines occupy considerable PCB area, operate at specific frequencies, and possess limited phase tunability. Furthermore, since the beam is consistently steered back to the transmitter, co-located APs become a requirement, which can introduce self-interference issues.

Figure 2D:
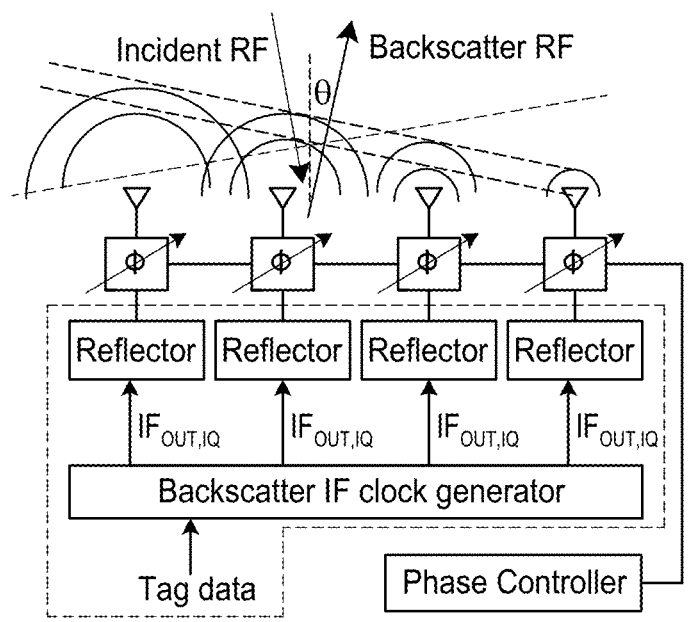

FIG. 2D shows another prior approach that provides full control over the beam direction. This approach provides a connection of the backscatter switch array to RF phase shifters, allowing the reflected signal to be combined in a manner similar to traditional beamforming systems, The backscatter IF clock generator serves the IF clocks in the same manner as the single antenna approach, with the clocks being directed to the duplicated reflectors. Phase shifters are inserted after each reflector to enable beamforming. This approach shares the downside of conventional beamforming, as it requires high-power active RF phase shifters, or lossy passive RF phase shifters.

BLE Backscatter

The modulator 150 of FIG. 1A can provide BLE backscatter. WiFi can be unavailable, such as with some wearable devices. BLE backscatter can be a substitute to transfer small amounts of data.

Figures 3A, 3B:
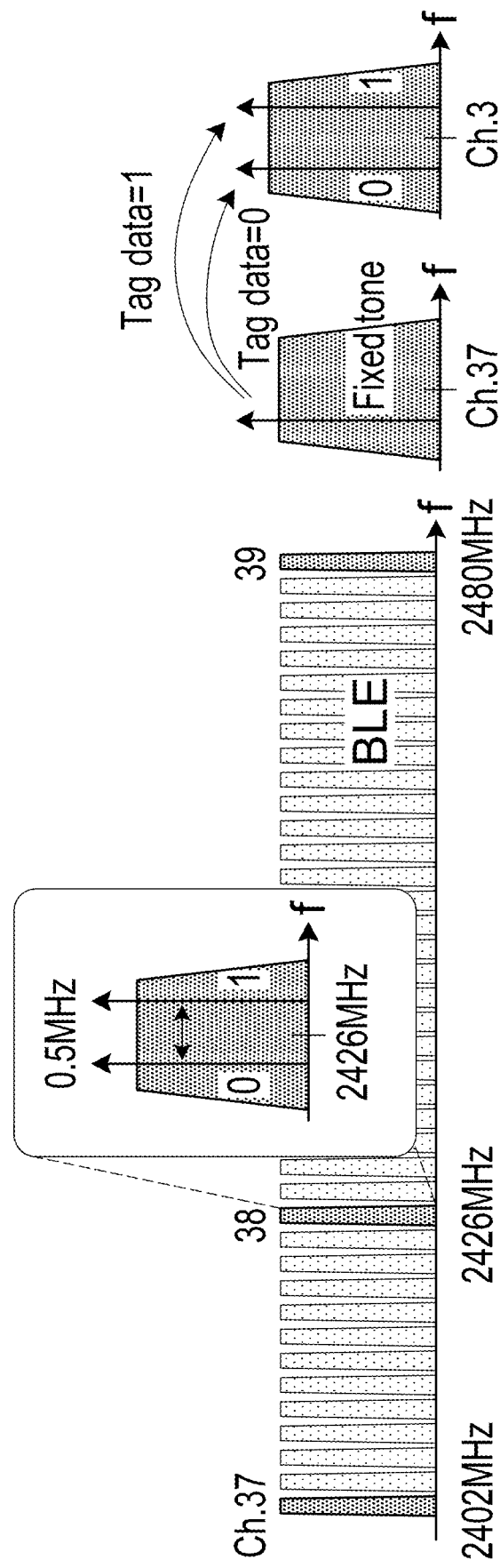
FIGS. 3A-3C (Prior Art) shows prior art BLE channel approaches.

FIG. 3A shows that BLE operates in the 2.4 GHz ISM band and encompasses 40 channels spaced by 2 MHz, with center frequencies ranging from 2402 to 2480 MHz. Unlike WiFi, which employs phase modulation, BLE utilizes GFSK modulation. The 1 Mbps data stream is represented by one of two modulation frequencies: symbol 1 is represented by a positive frequency deviation of +250 kHz, while symbol 0 is represented by a negative frequency deviation of −250 kHz from the channel's center frequency. A Gaussian filter is employed to shape the deviation before transmission. For establishing connections, BLE devices transmit advertising packets across three advertisement channels: channel 37 (2402 MHZ), channel 38 (2426 MHz), and channel 39 (2480 MHZ).

To enable backscattering, one approach transforms the incident signal into a single tone through reverse-whitening, where the data is set to all 0 s or 1 s. See, M. Zhang, J. Zhao, S. Chen, and W. Gong, "Reliable backscatter with commodity ble," in IEEE INFOCOM 2020—IEEE Conference on Computer Communications, 2020, pp. 1291-1299. A direct frequency shift scheme based on BFSK (Binary Frequency Shift Keying) is utilized.

Figure 3C:
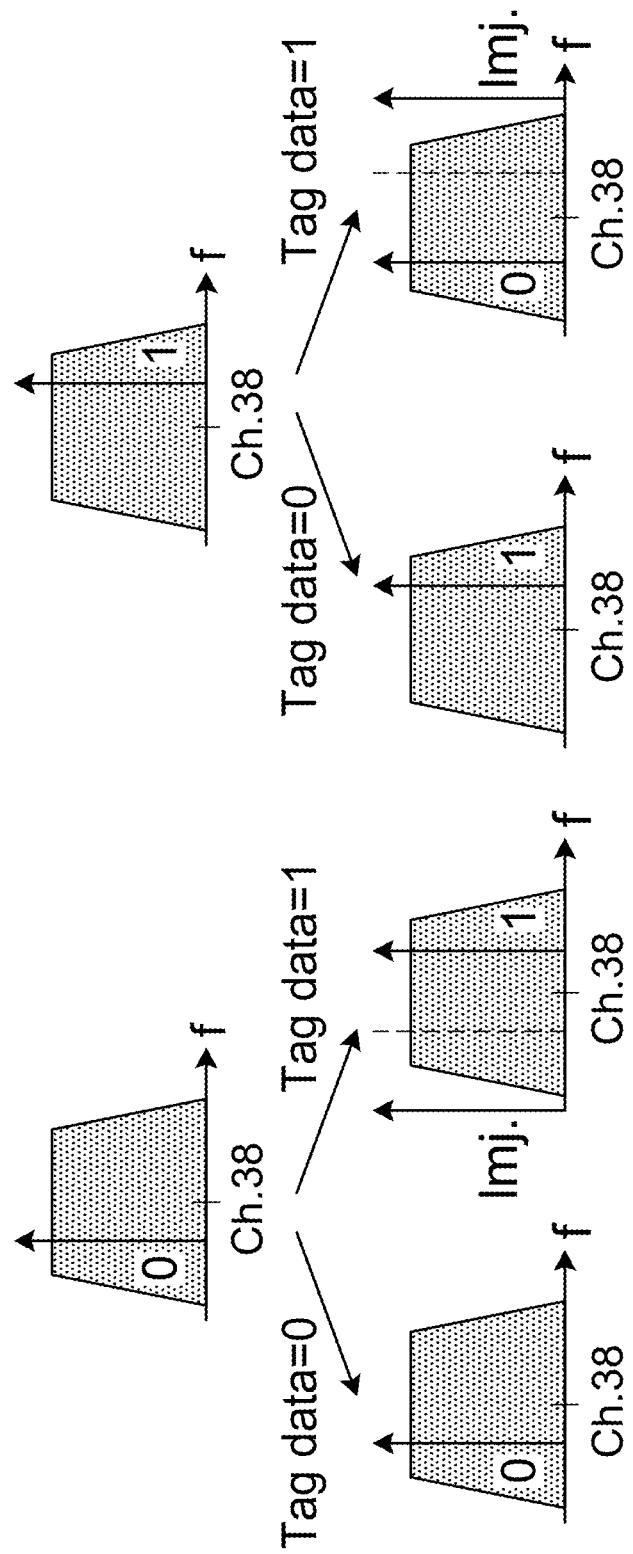

FIG. 3B shows an example, with the input signal set to symbol 0 at channel 37, and the target backscatter channel is channel 3, when the tag data is 1, the backscatter frequency will be on the upper side of channel 3, resulting in an IF of 8.5 MHz. Conversely, when the tag data is 0, the backscatter frequency will be on the lower side of channel 3, with an IF equal to 8 MHz. FIG. 3C shows another backscattering method that modulates tag data 1 by changing the BLE symbol 0 to 1 or 1 to 0, while tag data 0 keeps the BLE symbol unchanged. See, Zhang, C. Josephson, D. Bharadia, and S. Katti, "Freerider: Backscatter communication using commodity radios," in Proceedings of the 13th International Conference on Emerging Networking Experiments and Technologies, ser. CoNEXT '17. New York, NY, USA: Association for Computing Machinery, 2017, p. 389-401. This modulation takes place in the same channel as the incident signal, inevitably producing an image copy within the channel. Unlike WiFi, where single-sideband cancellation can be employed, BLE tags are unaware of the incident symbols, and are thus unable to determine which sideband should be canceled.

Figure 3D:
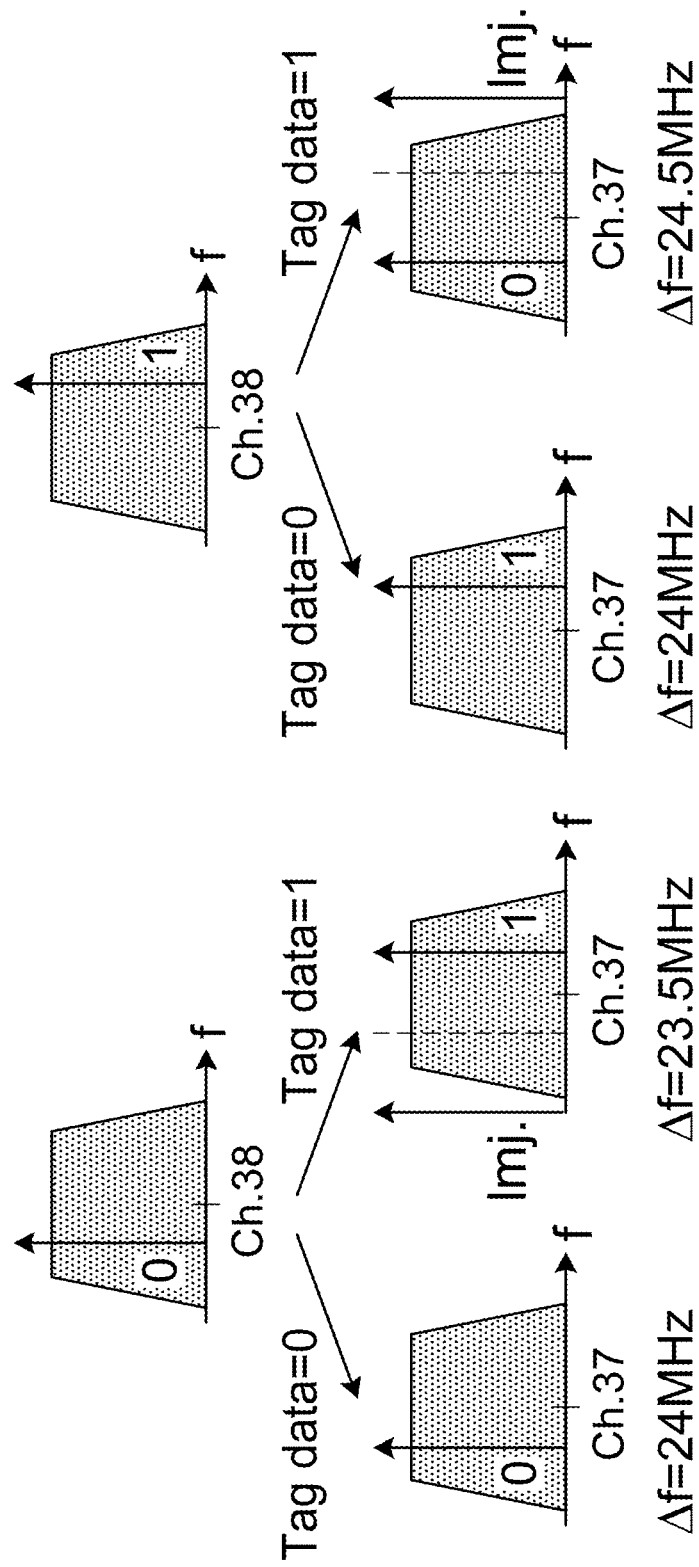
FIG. 3D shows a preferred method for BLE backscatter channel selection that avoids the issue of the backscattered signal landing in the incident channel.

FIG. 3D illustrates the preferred method approach to address the issue of the backscattered signal landing in the incident channel. The present method, implemented by the modulator 150 of FIG. 1A, provides IF frequency translation during backscatter. Taking the translation from Channel 38 to Channel 37 as an example, when the tag data is 0, the backscattered signal remains unchanged, resulting in an IF of 24 MHz. On the other hand, when the tag data is 1, to move symbol 0 in Channel 38 to symbol 1 in Channel 37, an IF of 23.5 MHz is required, while moving symbol 1 in Channel 38 to symbol 0 in Channel 37 necessitates a frequency of 24.5 MHz. However, since the incident signal cannot be controlled without knowledge of its content, it is necessary to generate these two possibilities simultaneously. This can be achieved by XOR-ing a 0.5 MHz clock with a 24 MHz clock. The resulting 1 MHz—away image remains, but it can be easily eliminated by employing a digital filter at the receiver.

The following table illustrates this example.

| Incident | Tag data | Backscatter | Required IF |
|----------|----------|-------------|-------------|
| 0/1 | 0 | 0/1 | 24 MHz |
| 0/1 | 1 | 1/0 | 23.5/24.5 MHz |

M. Zhang, J. Zhao, and W. Gong, "Practical backscatter with commodity ble," in ICC 2021—IEEE International Conference on Communications, 2021, pp. 1-6 provides an alternative method of converting the tone to a BLE signal by modulating the phase of the incident signal instead of directly shifting its frequency, assuming BFSK. This approach relies on the fact that instantaneous frequency change can be equivalently converted to instantaneous phase change. Given the BLE GFSK modulation index of 0.5, the phase shift between each symbol is always either plus or minus 90 degrees, enabling the generation of IF clocks using a quadrature clock with a state machine. This alternative approach yields improved Packet Error Rate (PER) compared to the BFSK approach, and can be used with the present invention.

While specific embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

The invention claimed is:

1. A beam-steering backscatter circuit, comprising:
   an antenna array and SP4T (single pole four throw) reflector array configured to receive and transmit through the antenna array;
   a baseband phase-shifting module that modulates an incident signal based upon tag data to create an output signal and re-radiates the output signal with a controllable angle of direction through the SP4T (single pole four throw) reflector array; and
   a phase locked loop synchronized with a wake-up receiver, the phase locked loop providing an intermediate frequency (IF) clock to the baseband phase shifting-module.

2. The beam-steering backscatter circuit of claim 1, wherein the baseband phase-shifting module comprises a beam-steering modulator that digitally phase-shifts IF control signals from the phase-locked-loop to provide four differently phased versions of the output signal and provides one of the four differently phased versions of the output signal to one of four SP4T (single pole four throw) reflectors in the SP4T (single pole four throw) reflector array.

3. The beam-steering backscatter circuit of claim 2, comprising a WiFi/Bluetooth Low Energy modulator that provides an IF control signal to an SP4T (single pole four throw) reflector of the SP4T (single pole four throw) reflector array, the SP4T (single pole four throw) reflector reflecting a signal from a single antenna.

4. The beam-steering backscatter circuit of claim 1, comprising no transmission lines.

5. The beam-steering backscatter circuit of claim 1, the beam-steering backscatter circuit being integrated in a tag device configured to communicate directly with commodity Wi-Fi transceivers (TRXs) via backscatter modulation, the tag device comprising:

the wake-up receiver, wherein the phase-locked loop is enabled by the wake-up receiver.

6. The beam-steering backscatter circuit of claim 1, wherein the wake-up receiver comprises an energy-detection based architecture with circuitry to conduct a counter-based wake up.

7. A beam-steering backscatter circuit in an integrated tag device comprising:
 a wake-up receiver; and
 a phase-locked loop enabled by the wake-up receiver; and
 a backscatter transmitter enabled with the phase-locked loop, wherein the backscatter transmitter comprises a beam steering modulator operating at an intermediate frequency to separately provide multiple phase versions of a backscatter response signal to separate antennas in an antenna array through an SP4T (single pole four throw) reflector array.

8. The beam-steering backscatter circuit of claim 7, wherein the beam steering modulator digitally phase-shifts IF (intermediate frequency) control signals generated in the phase-locked loop to provide four differently phased versions of the backscatter response signal and provides one of the four differently phased versions of the backscatter response signal to one of four SP4T (single pole four throw) reflectors in the SP4T (single pole four throw) reflector array.

9. The beam-steering backscatter circuit of claim 7, wherein the beam steering modulator digitally phase-shifts IF (intermediate frequency) control signals generated in the phase-locked loop to provide a plurality of differently phased versions of the backscatter response signal and provides one of the plurality of differently phased versions of the backscatter response signal to one of a plurality of SP4T reflectors in the SP4T reflector array.

* * * * *